(12) United States Patent
Schultz et al.

(10) Patent No.: US 6,429,989 B1
(45) Date of Patent: Aug. 6, 2002

(54) METHOD FOR SELF-SERVOWRITING TIMING PROPAGATION

(75) Inventors: Mark D. Schultz, Elmsford; Bucknell C. Webb, Ossining, both of NY (US)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 09/592,740

(22) Filed: Jun. 13, 2000

(51) Int. Cl.[7] .................................................. G11B 5/09
(52) U.S. Cl. ..................... 360/51; 360/77.08; 360/78.14
(58) Field of Search .............................. 360/51, 53, 31, 360/75, 77.08, 78.14

(56) References Cited

U.S. PATENT DOCUMENTS

| | | | |
|---|---|---|---|
| 5,448,429 A | * | 9/1995 | Cribbs et al. .................. 360/51 |
| 5,485,322 A | | 1/1996 | Chainer et al. |
| 5,581,420 A | | 12/1996 | Chainer et al. |
| 5,612,833 A | | 3/1997 | Yarmchuk et al. |
| 5,615,058 A | | 3/1997 | Chainer et al. |
| 5,648,720 A | | 7/1997 | Yarmchuk |
| 5,659,436 A | | 8/1997 | Yarmchuk et al. |
| 5,668,679 A | | 9/1997 | Swearingen et al. |
| 5,757,574 A | | 5/1998 | Chainer et al. |
| 5,793,554 A | | 8/1998 | Chainer et al. |
| 5,844,742 A | | 12/1998 | Yarmchuk et al. |
| 5,875,064 A | | 2/1999 | Chainer et al. |
| 5,901,003 A | | 5/1999 | Chainer et al. |
| 5,907,447 A | | 5/1999 | Yarmchuk et al. |
| 5,991,115 A | | 11/1999 | Chainer et al. |
| 6,005,738 A | | 12/1999 | Chainer et al. |
| 6,031,680 A | | 2/2000 | Chainer et al. |
| 6,075,668 A | | 6/2000 | Chainer et al. |
| 6,078,450 A | | 6/2000 | Chainer et al. |
| 6,101,055 A | | 8/2000 | Chainer et al. |
| 6,101,063 A | | 8/2000 | Chainer et al. |
| 6,252,732 B1 | * | 6/2001 | Chainer et al. ................ 360/51 |

OTHER PUBLICATIONS

"A Self–Servowrite Clocking Process" by Schultz et al, IEEE Transaction on Magnetics, pp. 1878–1880, vol. 37, No. 4, Jul. 2001.*
"Regenerative clock technique for servo track writers", IBM Technical Disclosure Bulletin, vol. 33, pp. 310–311, Oct. 1990.*
U.S. application No. 08/882,396.
U.S. application No. 09/426,435.

* cited by examiner

*Primary Examiner*—Alan T. Faber
(74) *Attorney, Agent, or Firm*—Fleit, Kain, Gibbons, Gutman & Bongini P.L.; Jose Gutman; Casey P. August

(57) ABSTRACT

A method for writing timing marks on a rotatable storage medium, such as on a disk in a disk drive, includes the steps of: 1) during a rotation of the disk, detecting the passage of at least a portion of a first timing mark located at a radial trajectory at a first radius of the disk, and 2) during the same rotation of the disk, writing a second timing mark at a second radius of the disk. The second timing mark is located at least one of a) where at least a portion of the second timing mark overlaps at least a portion of the radial trajectory of the first timing mark, and b) where the second timing mark is in close proximity to the radial trajectory of the first timing mark. The second timing mark is written based on different parameters such as a measured time interval, a calculated time interval, and a predetermined delay.

27 Claims, 12 Drawing Sheets

METHOD FOR SELF-SERVOWRITING TIMING PROPAGATION

BACKGROUND OF THE INVENTION

1. Field of the Invention

This invention generally relates to the field of rotating media mass storage devices, and more particularly relates to recording servodata timing information on hard disk drives for non-overlapping read and write heads.

2. Description of Related Art

High track densities in rotating media mass storage devices are becoming possible with newer drive technologies in voice-coil and other types of servo positioners as well as the ability to read and write narrower tracks by using, for example, magnetoresistive (MR) head technology. When track densities are very great mechanical error of a lead screw-stepper motor combination becomes significant compared to track-to-track spacing, and an embedded servo helps determine the position of the head from the signals it reads.

Conventional disk drive manufacturing techniques, for example, include writing servotracks on the media of a head disk assembly (HDA) with a specialized servowriter instrument. Laser positioning feedback is used in such instruments to read the actual physical position of a recording head used to write the servotracks. Unfortunately, it is becoming more and more difficult for such servowriters to invade the internal environment of a HDA for servowriting because the HDAs themselves are exceedingly small and depend on their covers and castings to be in place for proper operation. Some HDAs are the size and thickness of a plastic credit card. At such levels of microminiaturization, traditional servowriting methods are inadequate.

Conventional servo-patterns typically comprise short bursts of a constant frequency signal, very precisely located offset from a data track's center line, on either side. The bursts are written in a sector header area, and can be used to find the center line of a track. Staying on center is required during both reading and writing. Since there can be sixty or more sectors per track, that same number of servo data areas must be dispersed around a data track. Further, the servo-data is generally dispersed around the data track by writing short bursts in each of the sixty or so sector header areas of the data track. Such data bursts can be used by the embedded servo mechanism to find the center line of the data track. This allows the head to follow the track center line around the disk even when the track is out of round (e.g., due to spindle wobble, disk slip, and/or thermal expansion). As the size of disk drives is reduced and track density is increased, the servo-data must be more accurately located on the disk.

Servo-data is conventionally written by dedicated, external servowriting equipment, and typically involve the use of large granite blocks to support the disk drive and quiet outside vibration effects. An auxiliary clock head is inserted onto the surface of the recording disk and is used to write a reference timing pattern. An external head/arm positioner with a very accurate lead screw and a laser displacement measurement device for positional feedback is used to precisely determine transducer location and is the basis for track placement and track-to-track spacing. The servo writer requires a clean room environment, as the disk and heads will be exposed to the environment to allow the access of the external head and actuator.

A conventional servo-data pattern on a disk comprises circular data tracks that are broken into sectors. Each sector typically has a sector header area followed by a data area. Each sector header area includes sector header information followed by a servo-data area that provides radial position information. The sector header information includes a servo-identification (SID) field and a grey code field that must be precisely aligned from track to track to prevent destructive interference in the magnetic pattern. Such interference can reduce the amplitude of the signal and cause data errors.

During conventional drive manufacturing, the disk drive is typically mounted in a mastering station that is known as a servo-writer. The servo-writer has sensors that are positioned outside of the disk drive to locate the radial and circumferential position of at least one of the drive's internal heads. Using information from the sensors, the servo-writer causes the head to write a pattern, typically magnetic information, (i.e., servo-data) onto the disk. As explained above, the servopattern becomes the master reference used by the disk drive during normal operation to locate the tracks and sectors for data storage. When such a station is used to perform the servo-writing, manufacturing expenses increase because each disk drive must be mounted in the servo-writer. Additionally, the mechanical boundary conditions of the disk are altered because the external sensors must have access to the actuator and the disk spindle motor. Thus, mechanical clamping and disassembly of the drive may also be required.

According to another conventional servo-writing process, a master clock track is first written on the disk by a separate head to serve as a timing reference for the entire servo-track writing operation. After writing the master clock track, "even" servo-data bursts are written over the entire surface of the disk by first moving the arm to the outer crash stop and then radially moving the arm a distance that is less than a data track width for each revolution of the disk.

After reaching the inner diameter of the disk, the arm is once again moved to the outer crash stop and then radially moved for each revolution of the disk to write "odd" servo-data bursts. After servo-writing is completed, the number of steps of the arm from the outer crash stop to the inner crash stop is compared with the desired number of tracks. If the number of steps is different from the desired number of tracks, a bias is introduced and the process is repeated so that the number of steps will equal the desired number of tracks.

Such conventional servo-writing procedures require the use of an external timing sensor in order to write the timing patterns that are used to determine the circumferential head position. Because external sensors are needed, the servo-writing must be performed in a clean room environment. Additionally, an external clock source and auxiliary clock heads are required to write the timing information. Further, in such procedures, an entire disk of information must be written to determine the track pitch to use to write the servopattern. This takes times and leads to higher manufacturing costs.

To overcome such problems, self-servo-writing timing generation processes have recently been developed. These processes allow accurately aligned servo-data tracks to be written sequentially at each servo data radius without using any mechanical, magnetic, or optical positioning systems to control the circumferential positioning of the servo data. Further, the need for auxiliary clock heads to write a reference timing pattern on the disk is eliminated.

According to one method, first timing marks are written at a first radial position of the storage medium. Timing marks are defined here to be data patterns from which an accurate time of passage can be determined. Timing marks can be the servo data itself or separate timing marks written only to assist in maintaining accurate circumferential positioning of the servodata during the servowrite process. Time intervals between selected pairs of the first timing marks are measured. The head is moved to a second radial position. Next, additional timing marks are written by recording the time of passage of every other timing mark (say the odd numbered ones) and writing the intervening time marks (the even numbered ones) at a calculated delays thereafter. Time intervals between selected pairs of the first timing marks are measured. The head is moved to a second radial position. Next, additional timing marks are written by recording the time of passage of every other timing marks at the circumferential positions just written (here the even numbered ones) and writing the intervening time marks (the odd numbered ones) at a calculated delays thereafter. In the preferred method, servo data is written on one or more disk surfaces in the intervals between the timing marks In a preferred method, the steps of measuring, moving, and writing other timing marks are repeated until the servopattern is written on an entire surface of the storage medium.

According to another method, first timing marks are written at a first radial position of the storage medium. Time intervals between selected pairs of the first timing marks are measured. The head is moved to a second radial position. Next, additional timing marks are written by recording the time of passage of every other timing mark (say the odd numbered ones) and writing the intervening time marks (the even numbered ones) at a calculated delays thereafter. The time intervals between the newly written (even) marks are estimated to be the difference in times of passage of the adjacent timing (odd) marks plus the difference in the delay before writing the new timing marks. The head is moved to a second radial position. Next, additional timing marks are written by recording the time of passage of every other timing marks at the circumferential positions just written (here the even numbered ones) and writing the intervening time marks (the odd numbered ones) at a calculated delays thereafter.

The time intervals between the newly written (odd) marks are estimated to be the difference in times of passage of the adjacent timing (even) marks plus the difference in the delay before writing the new timing marks. In the preferred method, servo data is written on one or more disk surfaces in the intervals between the timing marks In a preferred method, the steps of measuring, moving, and writing other timing marks are repeated until the servopattern is written on an entire surface of the storage medium.

While such self-servo-writing processes are sufficient when the servo-data tracks are to be written using overlapping read and write heads (i.e., where a track can be written and read without changing head position), disk drives with non-overlapping read and write elements are now being produced. More specifically, as read and write element dimensions have been decreased to increase storage density, the widths over which reading and writing occur have decreased more rapidly than the distance between the read and write elements themselves. As a result, when using a head with such elements on a rotary actuator, the read element of the head can no longer overlap the area written by the write element of the head at all radial positions. When the above self-servo-writing processes are used for drives in which the read and write elements do not overlap, accurate circumferential alignment of the servo-data tracks is not maintained and there is a lack of stability against the growth of random errors in the pattern generation process.

According to another method, first timing marks are written at a first radial position of the storage medium. The head is moved to a second radial position. Time intervals between selected pairs of the first timing marks are measured. Next, additional timing marks are written by recording the time of passage of every other timing mark (say the odd numbered ones) and writing the intervening time marks (the even numbered ones) at a calculated delays thereafter. The head is moved to a second radial position. Time intervals between selected pairs of the first timing marks are measured. Next, additional timing marks are written by recording the time of passage of every other timing marks at the circumferential positions just written (here the even numbered ones) and writing the intervening time marks (the odd numbered ones) at a calculated delays thereafter. In a preferred method, the steps of moving, measuring, and writing other timing marks are repeated until the servopattern is written on an entire surface of the storage medium.

In this self-servo-writing process the placement of new timing marks normally has occurred at least every other revolution to allow reading of existing timing marks during a revolution before writing a subsequent new timing mark. In addition, with all of these process only half of the timing mark locations are written at each radial position. This, unfortunately, can result in odd-even sector asymmetry, reduced signal strength at the timing mark, and increases the overall time between measurements during which the motor speed can significantly vary possibly introducing additional timing errors into measurements of timing mark locations.

Therefore a need exists to overcome the problems with the prior art as discussed above, and particularly for a method to more efficiently write timing marks on rotatable storage media for writing servo-data tracks thereon.

DESCRIPTION OF THE PREFERRED EMBODIMENTS

Figure 1:
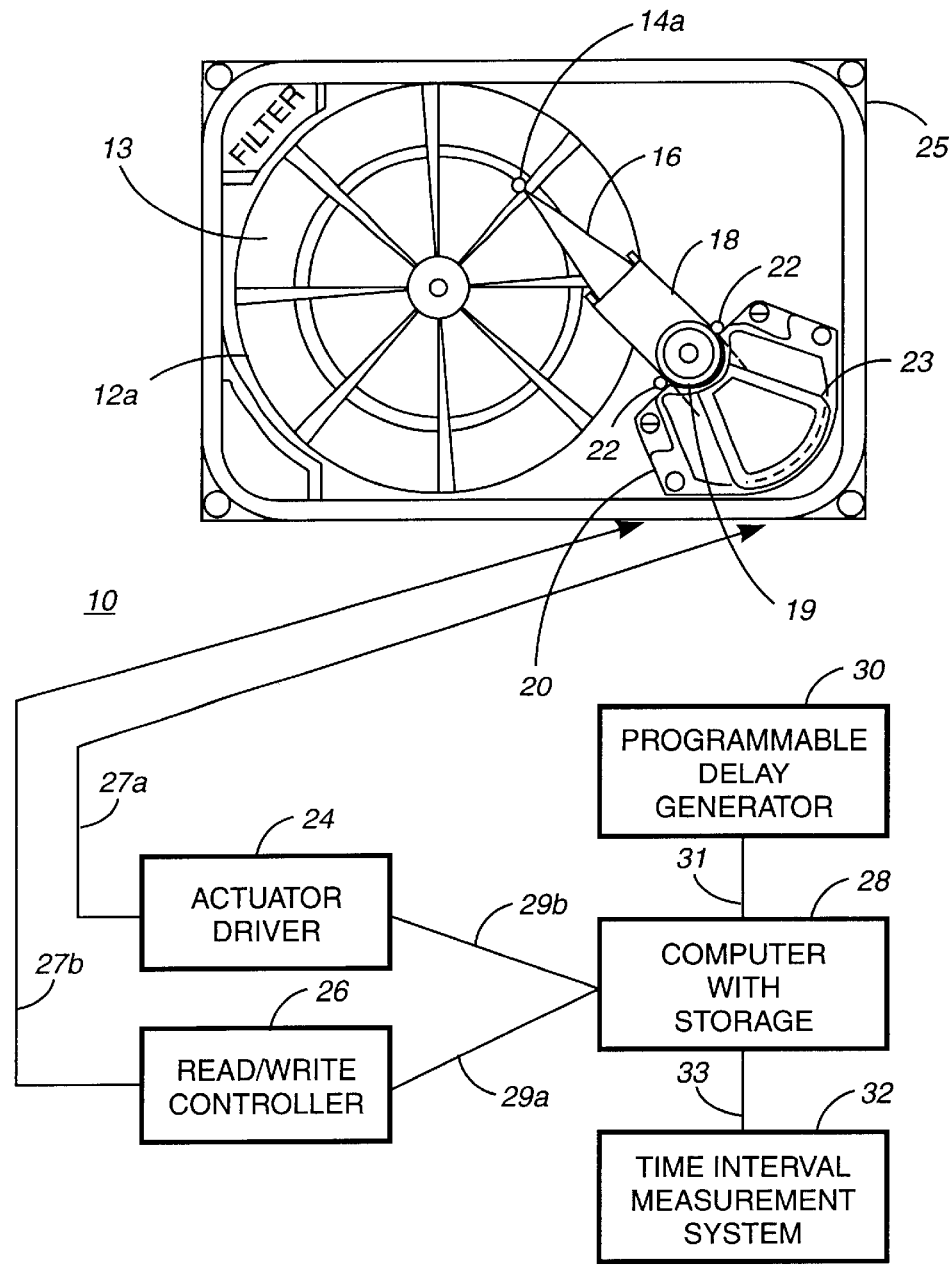
FIGS. 1 and 2 illustrate a disk drive and associated control apparatus for use with a self-servo-writing process according to a preferred embodiment of the present invention.

The present invention, according to a preferred embodiment, overcomes problems with the prior art by detecting both the passage of the timing marks and writing radial extensions to timing marks at the substantially the same circumferential positions. This is feasible even if a disk drive or similar systems is unable to write and read at the same time, and is facilitated if the read head is a separate element that encounters points on a disk surface slightly before the write head as the disk rotates so that the detection of an existing timing mark can take place before the writing of a timing mark in the same circumferential location. After the read operation occurs this delay allows the subsequent write operation at substantially the same tangential location on the same revolution. Using this process which records the passage of every timing mark improves the accuracy of timing mark placement and produces a commensurate improvement in the placement of the concomitantly written servo data.

Particularly, heads that can read and then write at the same circumferential location on the same revolution will benefit from the present invention. According to a preferred embodiment of the present invention, every timing mark is both read and written on each step in the same revolution (rotation) of a disk in a drive. The read element accesses a particular slot immediately prior to the write element accessing the same slot on the disk. After the read operation occurs, the presence of a significant delay allows the subsequent write operation at substantially the same tangential location on the same revolution. Heads that read and then write at the same tangential location on the same revolution can especially benefit from the present invention. Additionally, systems utilizing heads where the difference in tangential locations between where the read and the write occurs is small compared to the read to write radial offset, can particularly benefit by writing extensions to timing marks, as will be discussed below. Preferred embodiments of the present invention have the advantage over the prior art that the alignment accuracy of the written pattern is significantly less sensitive to variations in rotation speed variations and the shape of written transitions.

According to a preferred embodiment of the present invention, a servo architecture is "embedded servo" in which a clock propagation process is used to write servo pattern information on disk surfaces of the disk drive. To write the servo pattern, a clock is utilized to position the servo-data circumferentially. In a self-propagation process, only the normal data heads of the disk drive are used to generate the clock that is used to write the servo pattern.

The method according to the preferred embodiments detects both the passage of timing marks and then writes radial extensions to all of those timing marks at substantially the same circumferential positions. This is possible, despite the inability of a disk drive or similar rotatable medium systems to write and read at the same time, when the read head is a separate element that encounters points on a rotating disk surface slightly before the write head element so that the detection of an existing timing mark can take place before the writing of a new timing mark in substantially the same circumferential location. The improved accuracy of timing mark placement produces a commensurate improvement in the placement of the concomitantly written servodata.

A timing mark extension is defined here to be a timing mark written at least in part at the same circumferential location as, and coherently and aligned with, the data of, some portion of an existing timing mark at a neighboring radial location such that some part of the two timing marks can be read simultaneously by the read head at some radial position. The goal is to maintain a precise alignment of the timing marks so as to provide exact indicators of the rotational position of the disk during the servowrite process. By coherent and aligned we mean that at each radius where some part of a timing mark would be read as a particular data pattern before writing a timing mark extension the same data pattern would be readable after the extension is written. Note that we do not have to overlap or align the entire timing mark, and may not want to. In one preferred embodiment, we select trajectories (defined by a set of extensions to each original timing mark) so that the timing marks are preferably observed at a predetermined delay after a motor index or some other absolute rotational position indicator. However, the trajectories that the extensions to timing marks follow, can be chosen to spiral or curve in any arbitrary way consistent with the definition of trajectory. We define a radial trajectory as the area on a rotatable storage medium, such as a disk, that is defined by the area spanned by an initial timing mark and the set of timing mark extensions to that initial timing mark. An approximation to the final written radial trajectory may be predetermined as a target trajectory along which the timing marks are to be written.

Figure 2:
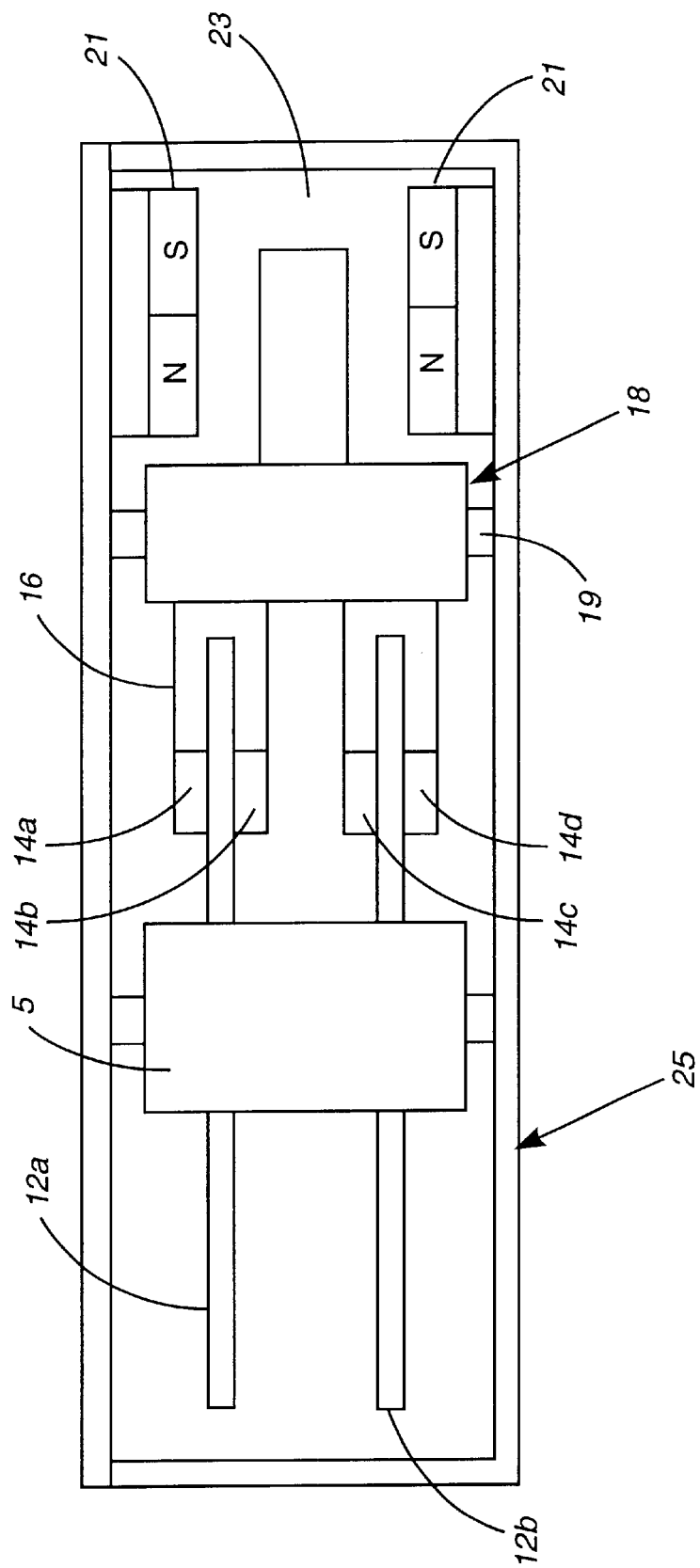

FIGS. 1 and 2 illustrate an exemplary disk drive system according to a preferred embodiment of the present invention. The drive 10 includes magnetic disks 12, such as disks 12a and 12b as shown, internal recording heads 14, such as heads 14a, 14b, 14c, and 14c, as shown, head suspension mechanisms 16, an actuator 18, an actuator attachment 20, and crash stops 22. Also shown in FIG. 1 are an actuator driver 24, a read/write controller 26, a computer 28, a programmable delay generator 30, and a time interval measurement system 32. In the illustrated drive, each of the magnetic disks has two surfaces that can store information in circular tracks 13. The internal recording heads 14 are used to write information onto these surfaces, and a spindle motor 5 spins the magnetic disks 12. Each recording head 14 is attached to a suspension mechanism 16 that allows the head to move in a vertical direction.

The actuator 18 (e.g., a standard moving coil actuator that includes a ball bearing 19) connects the suspension mechanism 16 to a voice coil motor 23 that has magnets 21. The crash stops 22 are provided on the sides of the ball bearing 19 to limit the range of the actuator 18, which is mounted to a base plate 25 via the actuator attachment 20. The actuator driver 24 is coupled to the drive via a wire 27a to provide current to the voice coil motor 23. Additionally, the read/write controller 26 is coupled to the drive via another wire 27b to read and write information (i.e., magnetic transitions) on the magnetic disks 12.

The computer is coupled to the actuator driver 24 and the read/write controller 26 via buses 29a and 29b, and to the programmable delay generator 30 (e.g., a Hewlett Packard HP8118A) and the time interval measurement system 32 (e.g., including a Hewlett Packard HP5372A time analyzer) via buses 31 and 33 (e.g., IEEE busses). The programmable delay generator 30 controls the write timing and the time interval measurement system 32 measures selected time intervals. The use of such hardware to write servo-data is further described in U.S. Pat. No. 5,615,058, which is herein incorporated by reference.

The timing system, as discussed above, has an accurate clock which can be used to record the time of passage of each timing mark on a rotating medium, e.g., a disk, and can generate signals to the write head to write new extensions to the timing marks at precise intervals afterward. The delay intervals are calculated from previously measured or estimated intervals using methods as will be discussed below. According to preferred embodiments of the present invention, the time of passage of each timing mark is recorded and the delay between the arrival of the read and write head at the same circumferential position is accurately measured or estimated from previous data to allow the writing of an extension to the existing timing marks at the same or nearly the same circumferential position.

While FIGS. 1 and 2 show an exemplary disk drive system and related hardware for use with preferred embodiments of the present invention, other types of rotatable media drives can also be used (e.g., drives having only one recordable disk or only one recording head) within the scope of the present invention. Although the discussion of preferred embodiments is illustrated with examples of magnetic media hard disk drive systems, other embodiments of the present invention may alternatively include non-magnetic rotatable media or a combination of magnetic and non-magnetic rotatable media within the scope of the present invention.

Figure 3:
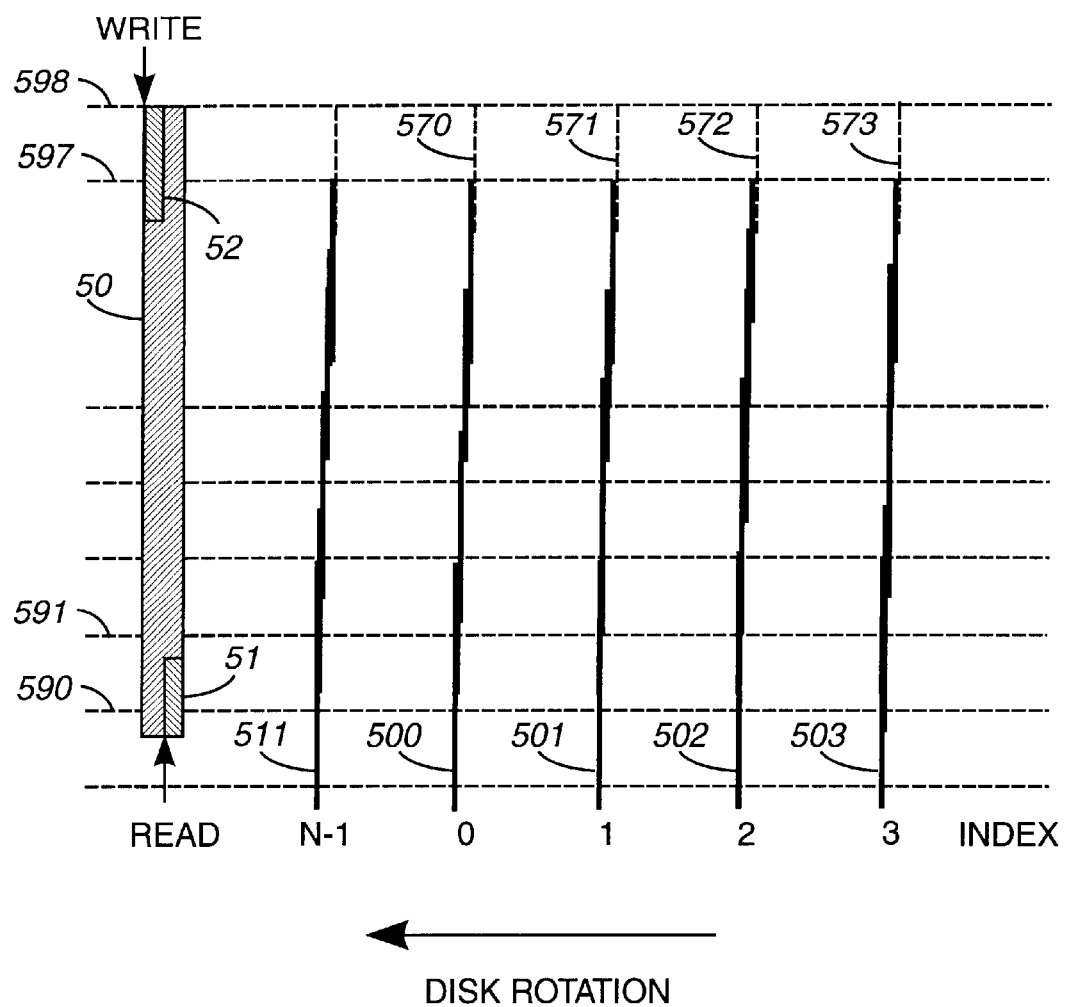
FIGS. 3, 4, and 5, are exemplary top planar views of portions of a disk and an offset read-write element head illustrated moving over the disk while reading and/or writing timing marks, according to preferred embodiments of the present invention.

As explained above, disk drives are now being manufactured with non-overlapping read and write elements. The self-propagation processes of the present invention provides timing control for writing servo-track information for such drives in which the radial position of the write element may not overlap the radial position of the read element for at least some radial position of the actuator arm. In other words, data written by the write element cannot be detected by the read element without changing the radial location of the head. The present invention is particularly suited for, but not limited to, use with disk drives having "offset" heads (i.e., the read and write elements are physically separated in the radial direction). FIG. 3 shows an exemplary offset head 50 in which the recording or writing element 52 and the magnetic detection or read element 51 are physically separated in the radial (i.e., track-to-track) direction. In this example, nine tracks, 590 to 598, are illustrated in the range of the offset head 50.

In embodiments of the present invention, when the head is positioned so that the write element writes servo-data at a given radial location, the read element passes over servo-data that was previously written at a different radial location. The servo-data is sequentially written at each radial position, so the read element must be displaced from the write element in a direction that is opposite to the direction of servo-track writing propagation. According to the preferred embodiments, the process is performed using timing marker generation and detection hardware such as that described above with reference to FIG. 1 and 2.

Figure 8:
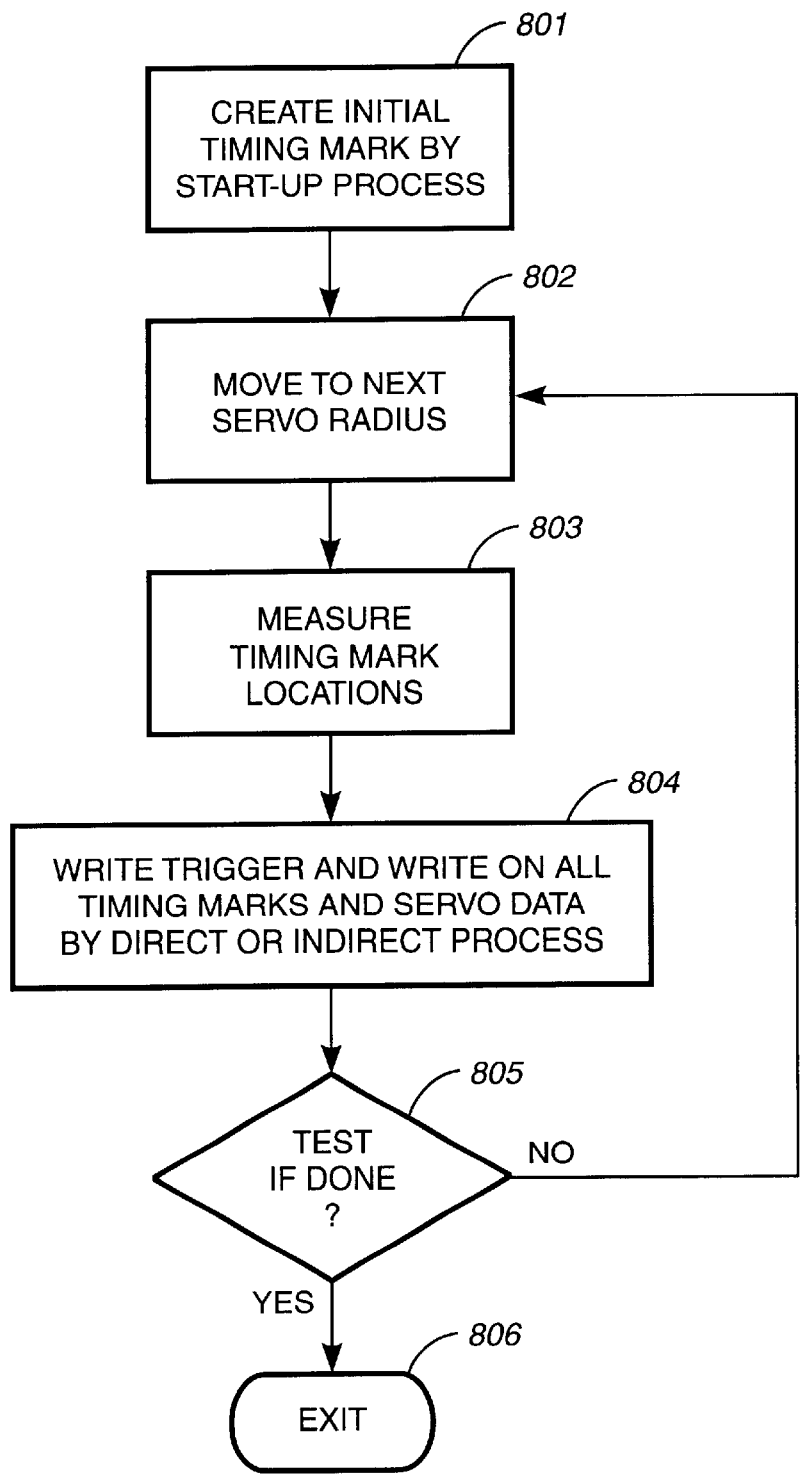
FIGS. 8, 9, 10, and 11, are four operational flow diagrams illustrating four exemplary methods for writing timing marks on rotatable storage media, according to preferred embodiments of the present invention.

FIG. 8 illustrates an overall process flow within which the embodiments of the invention can be used. We create 801 an initial set of timing marks by a start up process by a method such as taught in U.S. patent application Ser. No. 09/426,435. We move to a radius to write extensions to the timing marks 802. During a revolution of the disk we record the difference in time of passage of each timing mark so as to measure the intervals between all of the timing marks 803. At this point, according to a preferred embodiment of the present invention, as described below, we write extensions to the timing marks and write servo data 804. If we have not completed the servopattern we return to 802 and repeat, otherwise we exit 806.

Figure 10:
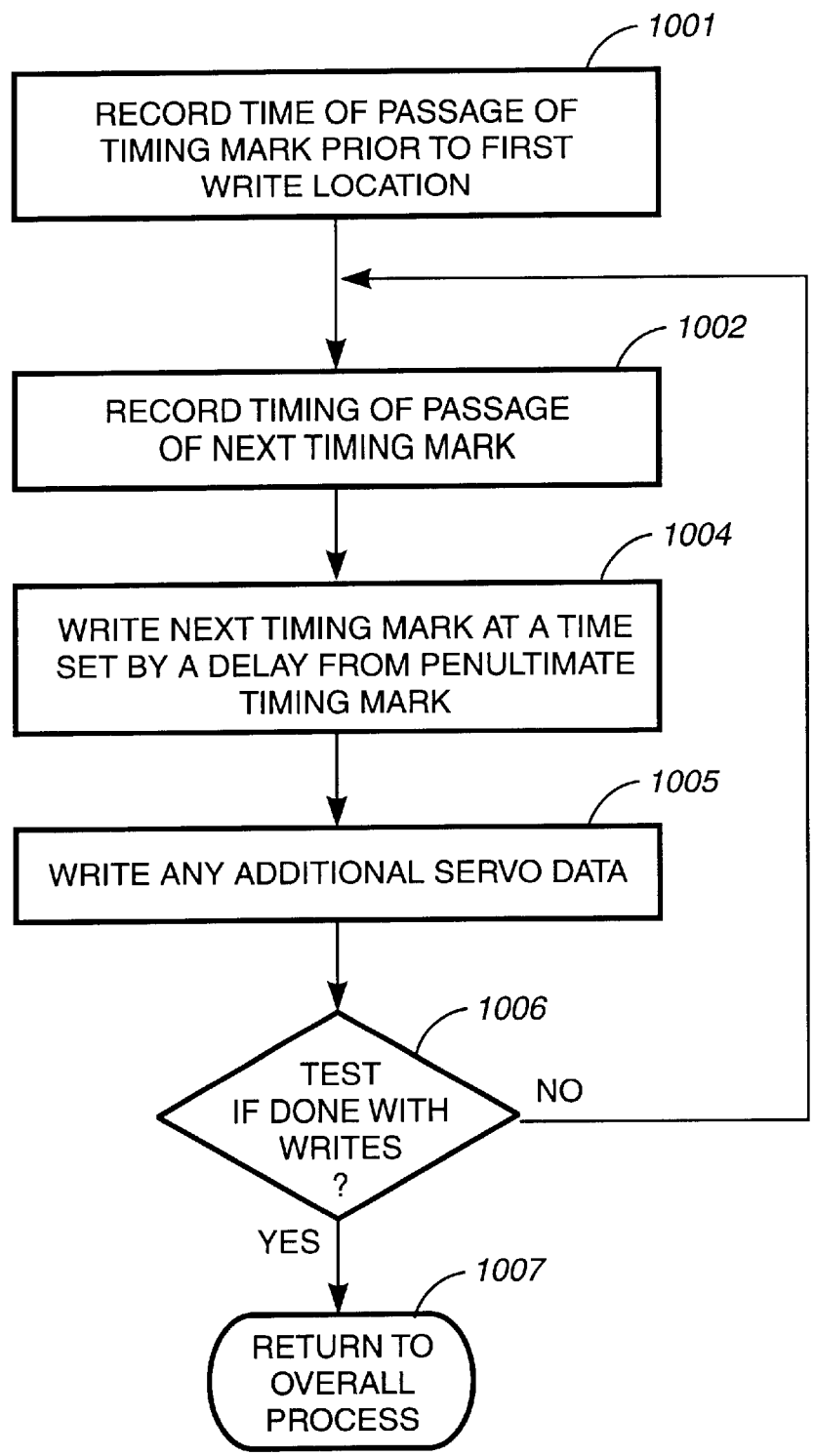

According to one exemplary embodiment, as illustrated by the step 804, a head is moved to write extensions to timing marks and servo data. Then, as illustrated in FIG. 10, after the head is moved, e.g., a fraction of a data track width, to a next servo-track position, the time of passage of the timing mark at one circumferential position is read 1001 and used to synchronize the writing of an extended trigger pattern timing mark 1004 in a subsequent circumferential position. Just prior to writing this extension, the time of passage of the timing mark 1002 at this new circumferential position is recorded. Any additional servo data is written thereafter at a predetermined delay after the timing mark 1005. If all of the timing marks have not been written at this radius, we repeat step 1002 to record the passage of the next timing mark and write an extension to that mark 1004 and servo data 1005. The process is repeated 1006 until all timing marks have been written. At that point we return to the overall process 1007 (such as in FIG. 8) and move to a next radial position.

The head is then moved to the next servo-track position and the process is repeated again. Preferably, this process is continuously repeated until trigger patterns of timing marks are written across the entire recording surface of the disk. For example, as shown in FIG. 3, the timing relative to a previous timing mark trajectory 500, such as position zero, is used to write the timing mark at the next timing mark trajectory 571, shown as position one. The process is repeated for the previous timing mark trajectory 501 and the subsequent timing mark trajectory 572, shown as position two, and then for timing mark trajectory 502 and subsequent timing mark trajectory 573, shown as position 3, and so on. This novel process will be discussed in more detail below.

Figure 4:
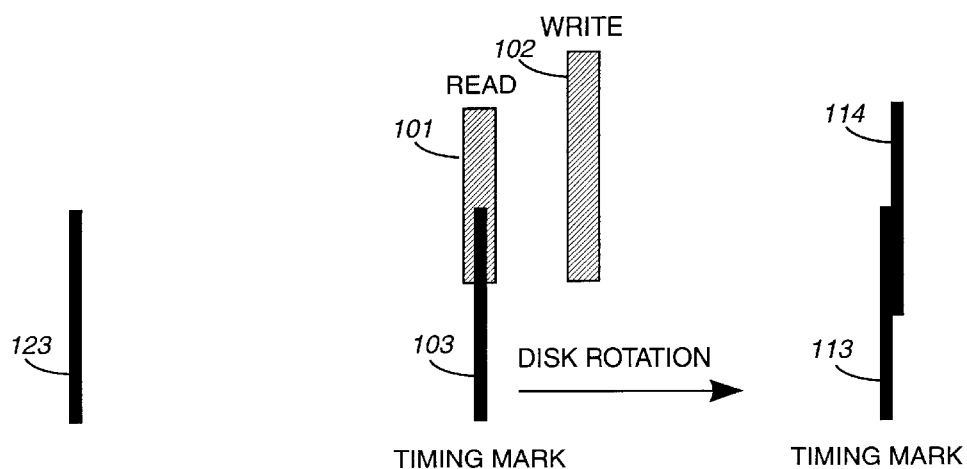
Figure 5:
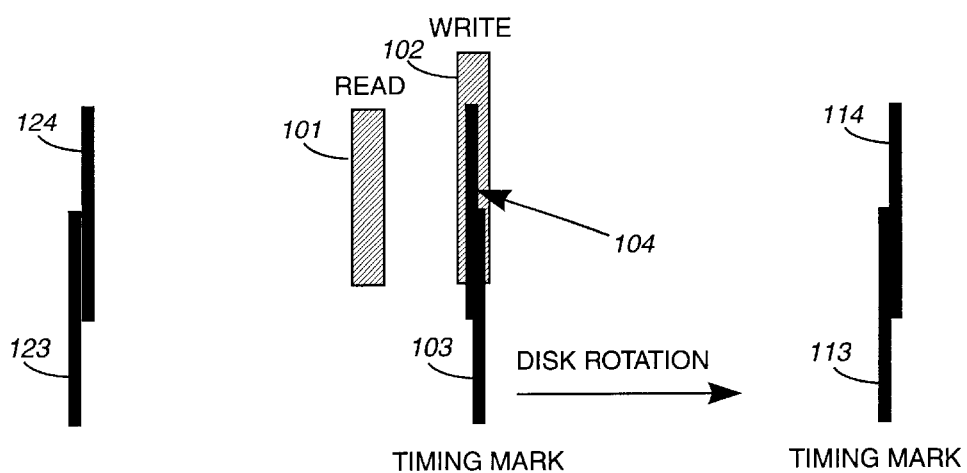

According to a preferred embodiment of the present invention, with reference to FIGS. 4 and 5, the delay interval for writing each new extension to the timing marks is referenced to the passage of the previous timing mark 113 rather than the more recent passage of the timing mark currently being extended 103. In the preferred embodiment, the passage of the timing mark 103 is recorded while the delay between the arrival of the read head 101 at a timing mark (as shown in FIG. 4) and the arrival of the write head 102 (as shown in FIG. 5) is used to write an extension 104 to the existing timing mark 103.

According to this preferred embodiment of the present invention, a method is provided for writing a servopattern on a storage medium. According to the method, first timing marks are written at a first radial position of the storage medium, and the head is moved to a second radial position of the storage medium.

In a second step, the time intervals between the timing marks to be detected by the read head 101 are determined, for example, by measuring the intervals between the timing marks during a rotation of the disk, as described in U.S. patent application Ser. No. 09/426,435, the teachings of which are herein incorporated by reference.

If the extension 104 is readable by the read element at the next radial position, the time measured between timing marks 113 and 103 during the write process may be used to estimate the interval between extensions 104 and 124. If T(113, 103) is the time measured between timing marks 113 and 103; TW(113, 104) is the target write delay between the read of timing mark 113 and the write of timing mark 104; and TW(103, 124) is the target write delay between timing marks 103 and 124: then an estimated time ET(104, 124) may be computed by the formula ET(104, 124)=T(113, 103)+*TW*(103, 124)−*TW*(113, 104).

This estimated time may be used in place of a direct measurement of T(104, 124) on the next radial step for purposes of computing new write time delays. For this case a separate read without write step at the next radial location is not necessary.

The delays between the detectable timing marks and the desired writing locations for additional marks are calculated utilizing the estimated time between the previous timing mark and the one being extended. The estimated times between the previous timing mark and the one being calculated can be preferably corrected for systematic delays according to the teachings of U.S. patent application Ser. No. 09/550,643 and U.S. patent application Ser. No. 08/882, 396 which are commonly owned by the assignee of the present patent application and are incorporated herein by reference. Additionally, in a preferred embodiment, corrections for errors accumulated from previous process steps are introduced according to the teachings of U.S. patent application Ser. No. 09/316,884, U.S. patent application Ser. No. 09/316,882, and U.S. patent application Ser. No. 08/891, 122, which are all commonly owned by the assignee of the present patent application and are incorporated herein by reference.

In this embodiment the delay for writing is the estimated or measured interval between the timing mark from which a delay is measured and the timing mark at the circumferential position to be written, plus the systematic and random error corrections:

delay=interval+systematic+random_error.

Then, additional timing marks are written at essentially the same circumferential positions during the same disk revolution using these delays. This is a significant advantage of the present invention. In the preferred method, the step of moving and the step of calculating delays and writing are repeated until the servopattern is written on an entire surface of the storage medium.

Figure 9:
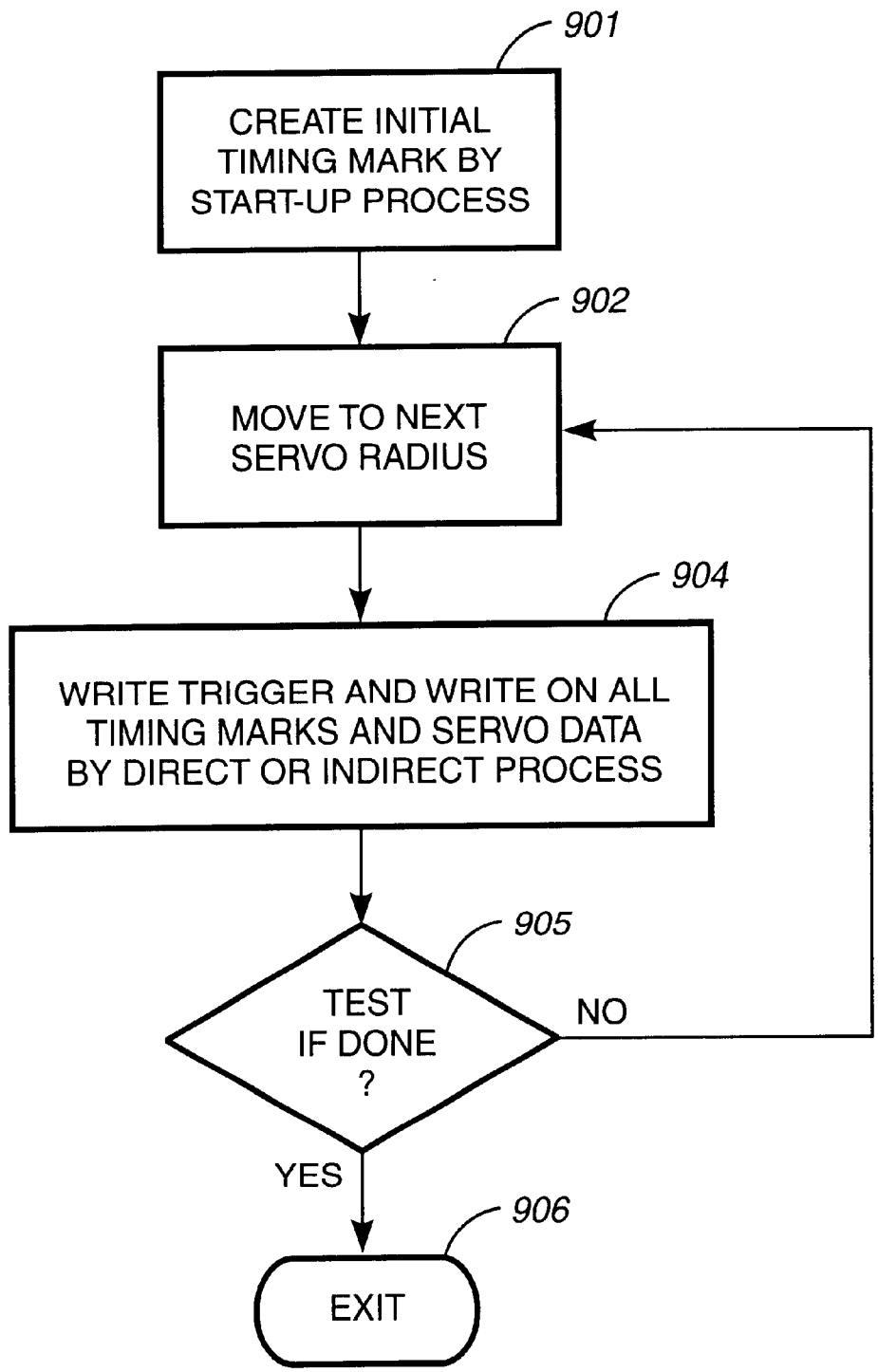

According to an alternative preferred embodiment of the present invention and as illustrated in the process step 904 of FIG. 9, the passage of each timing mark under the read head is detected and an extension to that timing mark is written at a calculated interval afterward. This embodiment differs from the previously discussed embodiment in that the time when a new timing mark extension is written is determined by the passage of a timing mark within the radial timing mark trajectory of the mark being extended. This method is very insensitive to variations in disk rotation speed as the extensions to each timing mark are directly referenced to a timing mark within the same radial trajectory.

FIG. 9 illustrates an overall process flow within which the embodiments of the invention can be used. We create 901 an initial set of timing marks by a start up process by a method such as taught in U.S. patent application Ser. No. 09/426, 435. According to this alternative preferred embodiment, we move to a radius to write extensions to the timing marks 902. We omit the measurement revolution of the disk sequence of steps and may use the intervals just measured during the previous step 902 as representative of the time intervals between timing marks located along matching radial trajectories at the current radius. At this point, according to a preferred embodiment of the present invention, as described below, we write extensions to the timing marks and to write servo data 904. If we have not completed the servopattern we return to step 902 and repeat, otherwise we exit 906.

Figure 6:
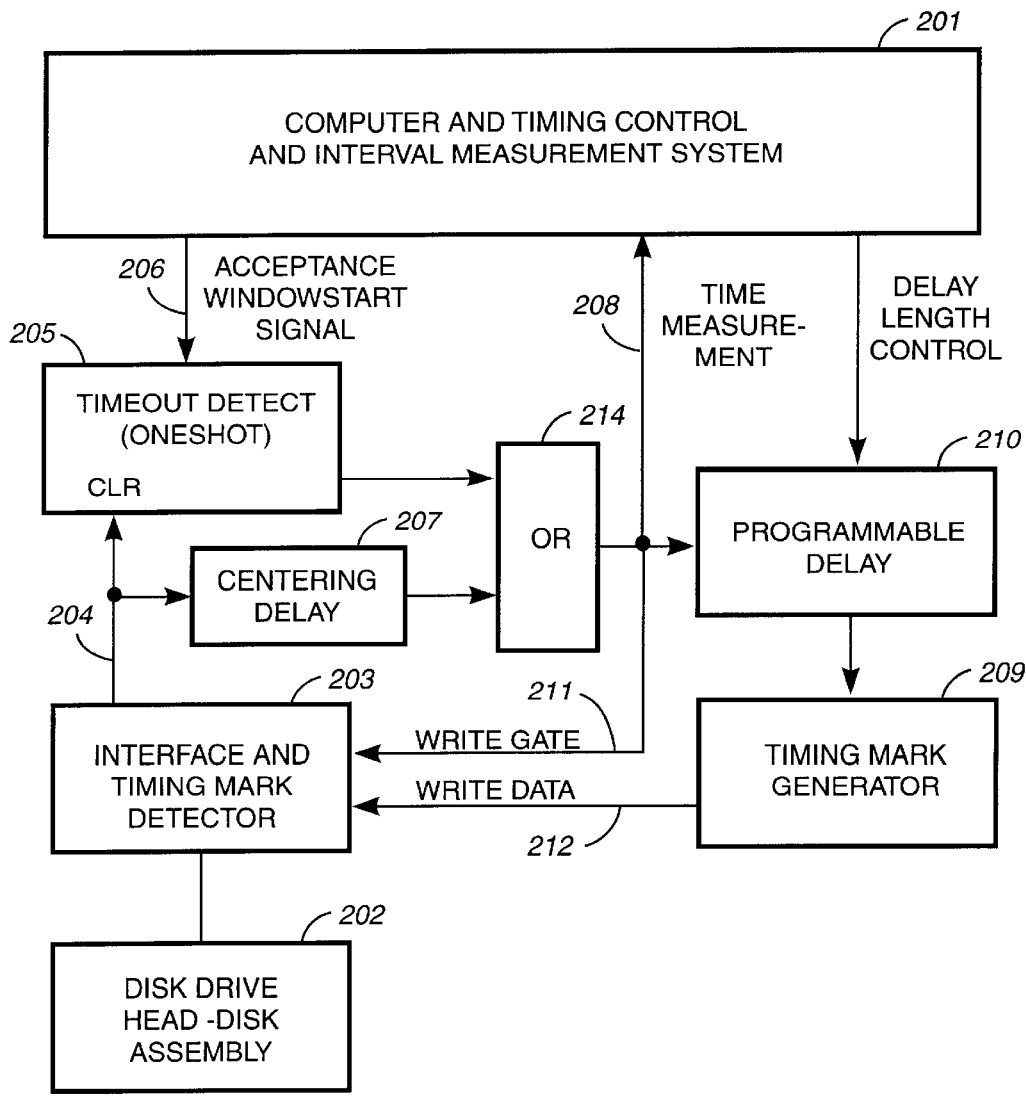
FIG. 6 is a block diagram showing an exemplary timing control and measurement system in accordance with a preferred embodiment of the present invention.
Figure 7:
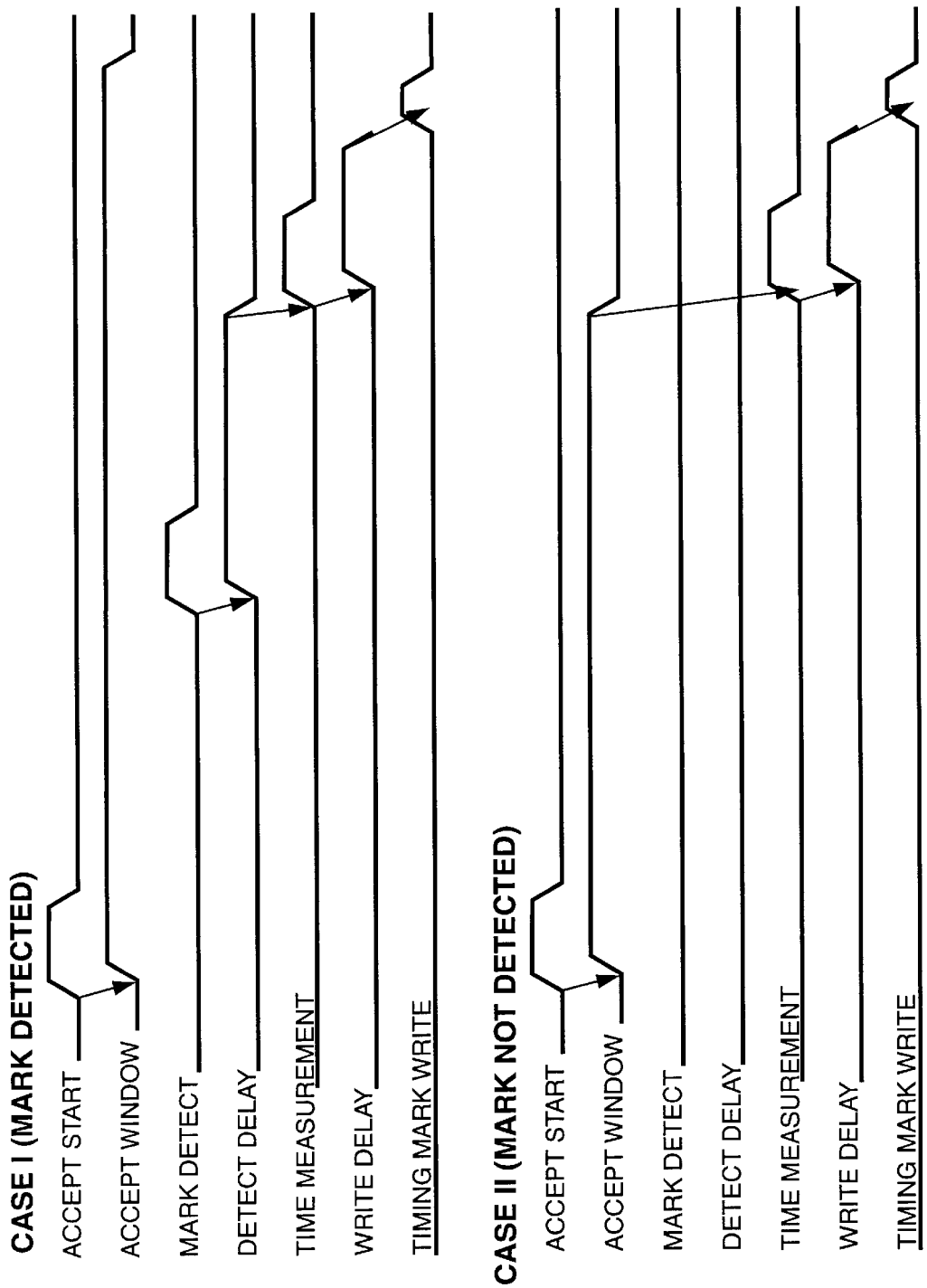
FIG. 7 is a timing diagram illustrating signals and events used by the system in FIG. 6, according to a preferred embodiment of the present invention.
Figure 11:
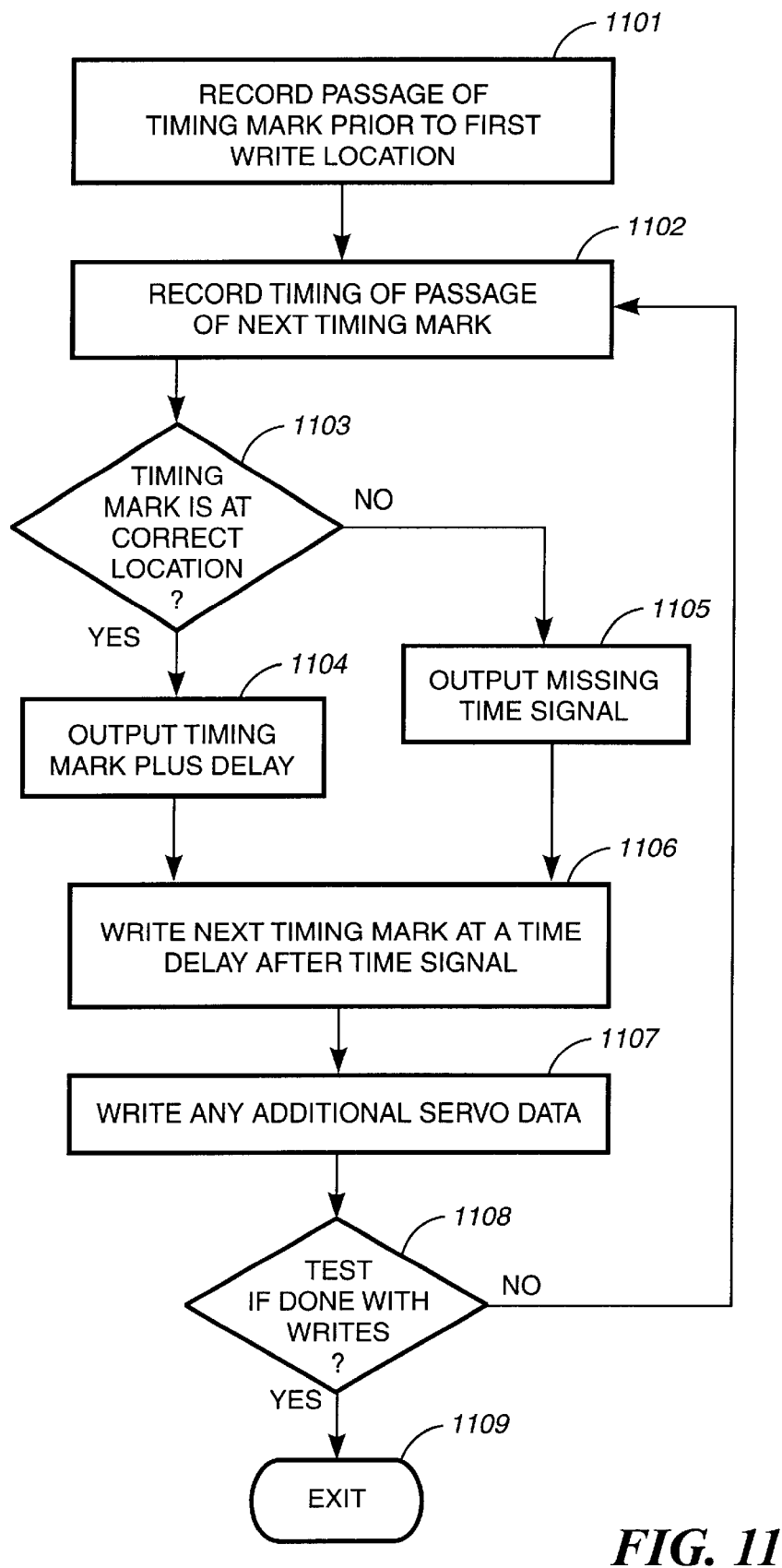

This alternative process can preferably be made more robust by determining, during the interval between reading and writing, whether a signal detected is at the expected timing location. The process, however, continues even if a trigger is missing or appears early, such as due to system noise. FIG. 6 illustrates a hardware implementation for performing a method of making this determination in accordance with this alternative preferred embodiment of the present invention. An associated timing diagram is shown in FIG. 7. With reference to FIGS. 6 and 7, the novel method will be discussed in detail below. Then as illustrated in FIG. 11, after the head is moved, e.g., a fraction of a data track width, to the next servo-track position, the time of passage of the timing mark at one circumferential position is read 1101 and is recorded. Recording of this time of passage can be effected in a number of different ways, as may be obvious to one of ordinary skill in the art. Preferably, a time indication is stored in a memory. The time of passage of the timing mark at the next circumferential position is recorded 1102. If the interval between the times of passage of the current and prior timing mark are within a preset range the time of passage is judged to represent an accurate detection of the timing mark location 1103 and is used to synchronize the writing of an extended trigger pattern timing mark 1106 at the same circumferential position. Otherwise a signal is output at the fixed delay after the expected time of passage 1105 to trigger the writing of the timing mark 1106. Any additional servo data is written thereafter at a fixed delay after the timing mark 1107. If all of the timing marks have not been written at this radius we repeat the steps 1102 to 1108 to record the passage of the next timing mark and write an extension to that mark 1106 and servo data 1107. The process is repeated 1108 until all timing marks have been written. At that point we return to the overall process (such as in FIG. 9) and move to the next radial position.

FIG. 6 illustrates the details of implementing steps 1103–1106, the timing system 201 brings the acceptance start line 206 high at a time following the previous timing mark which represents the earliest time that the timing mark can pass and not be rejected as a false trigger caused by noise. The timing window 205 then goes until the last allowed time for the arrival of the timing mark, a time earlier than the time where the write must be performed. Timing marks are received from the disk drive 202 and are detected by the circuitry 203 to create a mark detect signal 204. The mark detect (see case I in FIG. 7) disables the downward transition of the accept window and triggers the detect delay 207. The detect delay is set equal to the difference between the expected arrival of the timing mark and the closing of the acceptance window. The end of the detect delay triggers the time measurement signal at 214 going to the timing system 208 and the write delay 210, which has been set by the timing system 201 to the necessary delay to align the write of the extension of the timing mark with the existing timing mark. The end of the timing mark delay generates the actual timing mark write. If the timing mark is missing or occurs so early that acceptance window is closed (low), the second timing case (see case 11 in FIG. 7) occurs and the end of the acceptance window triggers the time measurement signal at 214 going to the timing system 208 and the write delay 210. This time delay has been set by the timing system 201 to the necessary delay to align the write of the extension of the timing mark with the existing timing mark.

The timing mark write delay is equal to the systematic delay plus correction terms. The systematic delay is measured in accordance with the teachings of U.S. patent application Ser. No. 09/550,643 and U.S. patent application 08/882,396 which are commonly owned by the assignee of the present patent application and are incorporated herein by reference. This systematic delay can be computed by detecting the rotation of the marks relative to an external disk orientation reference and is due (in the current case) to the difference in the time of arrival of the write and read heads combined with electronic delays minus the detect delay. The correction terms are calculated according to the teachings of U.S. patent application Ser. No. 09/316,884, U.S. patent application Ser. No. 09/316,882, and U.S. patent application Ser. No. 08/891,122, which are all commonly owned by the assignee of the present patent application and are incorporated herein by reference. As part of the correction method, the system shifts the new timing mark slightly to correct for errors in the position accumulated from previous steps in the process and are calculated from estimates or measurements of the intervals between previous timing marks. In this embodiment, the delay for writing is the sum of systematic and random error corrections:

$$delay = systematic + random\_error.$$

This embodiment of the present invention provides a method of writing a servopattern on a storage medium. According to the method, first timing marks are written at a first radial position of the storage medium, and the head is moved to second radial position of the storage medium. In a second step, the time intervals between the timing marks detectable by the read head are determined, either by measuring the intervals between them during a rotation of the disk, in accordance with the teachings of U.S. patent application Ser. No. 09/426,435, or from prior step interval data. The delays between the detectable timing marks and the desired writing locations for additional marks are calculated via methods as discussed above. Next, additional timing marks are written at essentially the same circumferential positions during substantially a single additional disk revolution using these delays. This feature provides significant advantages that are not available in known prior art systems and methods. In the preferred method, the step of moving and the step of calculating delays and writing are repeated until the servopattern is written on an entire surface of the storage medium.

Figure 12:
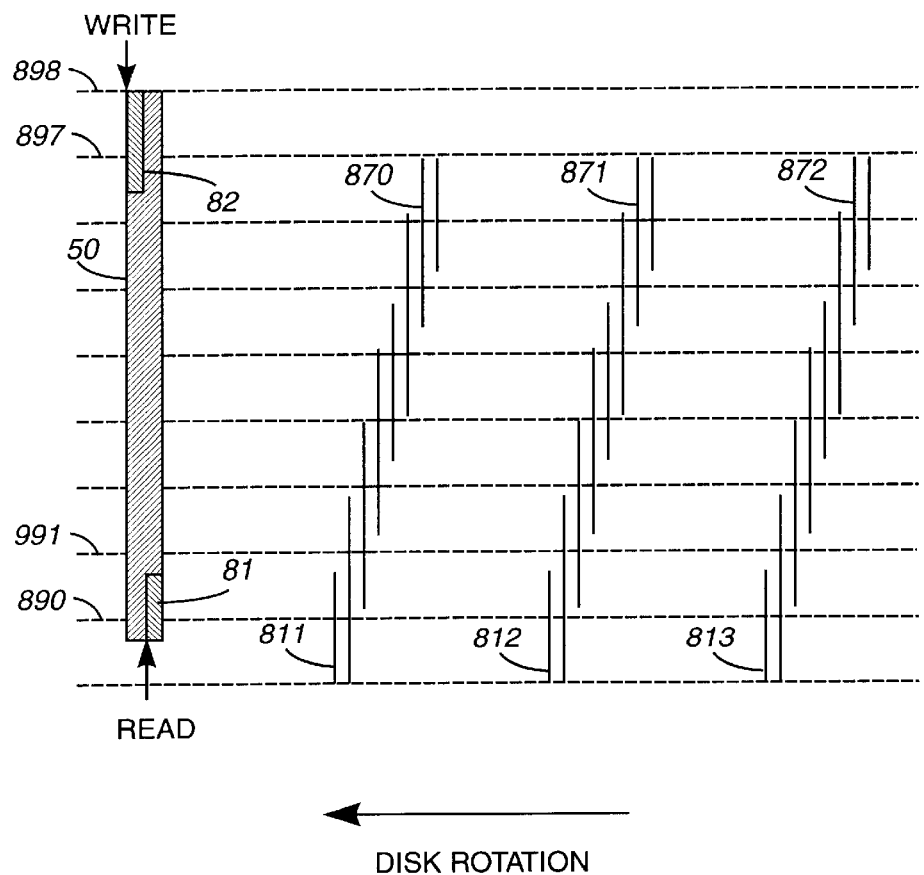
FIG. 12 is a top planar view of a portion of an exemplary rotatable storage medium illustrating writing of timing marks in accordance with a preferred embodiment of the present invention.

In the figures referred to in the discussion of the preferred embodiments above, for simplicity we have drawn timing marks as single lines of no significant width along a circumferential direction, and extensions to timing marks as a direct lining-up of lines. In actuality, however, timing marks have a finite width. FIG. 12 shows a generalized depiction of timing marks and timing mark extensions. Here the read head is aligned at 890 to write a timing mark extension at 897. The existing timing marks 811, 812–816 are shown as double lines indicating the extent of the timing marks along the circumferential direction and a data pattern; here the pattern comprises the two lines. As shown, each timing mark extension (812 to 811, 813 to 812 . . . ) is preferably written so that the timing mark extension overlaps the neighboring timing mark such that a portion of the timing mark is reproduced in the extension. Thus, if the read head is aligned so that it passes over two neighboring timing marks the data pattern is still present. An example would be the path 890 as shown and the timing marks 812 and 811. The path 890 is useful for systems utilizing heads where the distance between the read and write heads in the tangential direction is too small to read and write at the same rotational location but where the difference in tangential locations between where the read and the write occurs is small compared to the read to write radial offset. Another example is the timing marks 821–827 showing the direct lining up of neighboring timing marks.

Figure 13:
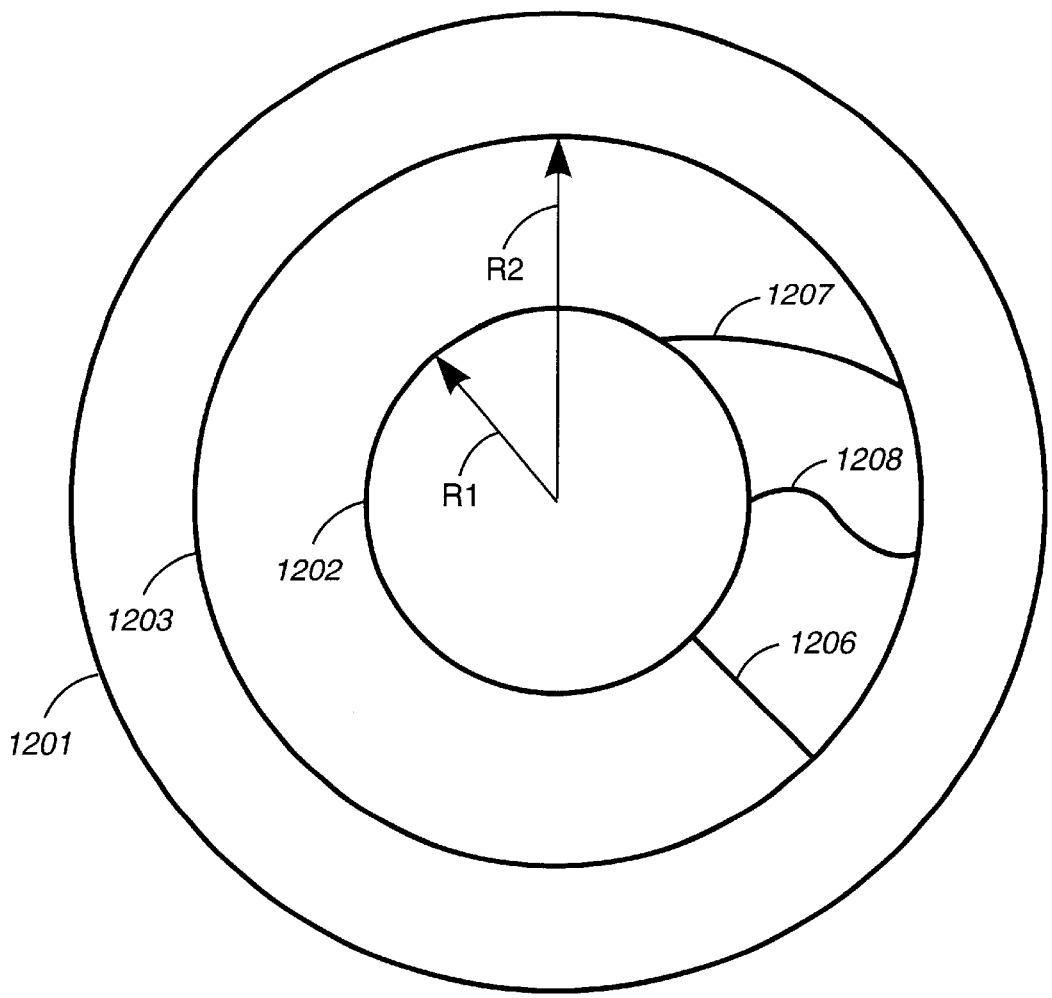
FIG. 13 is a top planar view of an exemplary rotatable storage medium illustrating writing of timing marks in accordance with alternative preferred embodiments of the present invention.

FIG. 13 illustrates a variety of exemplary radial trajectories. In the examples shown each timing mark trajectory shown 1206, 1207, 1208 is started by an initial set of start-up timing marks near a radius R1. As long as a set of neighboring timing marks are aligned to each other the trajectory followed by the set of timing marks can be arbitrary. In a first example, timing mark extensions 1206 follow a trajectory related to a radius. In a second example, timing mark extensions 1207 follow an arc, such as would be followed by a head moved by a radial actuator. This example would produce timing marks at a constant time relative to a rotational indicator such as a motor index. According to a third example, timing marks 1208 are shown in yet another alternative arrangement.

The present invention can be realized in hardware, software, or a combination of hardware and software. A controller in the timing control and measurement system, as illustrated in FIG. 6, and/or in a disk drive system as illustrated in FIGS. 1 and 2, according to the preferred embodiments of the present invention, can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may include computer readable information in a transitory state medium such as a network link and/or a network interface, including a wired network or a wireless network, that allow a computer to read such computer readable information. As shown, for example, in FIGS. 1, 2, and 6, and as discussed above, according to the present invention, the timing control and measurement system and the disk drive system, preferably comprise computer systems that include the computers and computer readable medium as discussed above.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for writing a plurality of timing marks on a rotatable storage medium, the method comprising the steps of:
    during a rotation of the rotatable storage medium, detecting the passage of at least a portion of a first timing mark located at a radial trajectory at a first radius of the rotatable storage medium;
    during the same rotation of the rotatable storage medium, writing a second timing mark at a second radius of the rotatable storage medium, the second timing mark being located at least one of
        a) where at least a portion of the second timing mark overlaps at least a portion of the radial trajectory of the first timing mark, and
        b) where the second timing mark is in close proximity to the radial trajectory of the first timing mark.

2. The method of claim 1, wherein the radial trajectory comprises an arc indicated by a motion of a sensor on an actuator moving radially across a stationary rotatable storage medium.

3. The method of claim 1, wherein the radial trajectory comprises a predetermined radial trajectory across a surface of a rotatable storage medium.

4. The method of claim 1, wherein the radial trajectory comprises a trajectory resulting from a propagation of a plurality of timing marks.

5. The method of claim 1, wherein the second timing mark at the second radius comprises at least one timing extension of the first timing mark at the first radius.

6. The method of claim 1, wherein the radial trajectory of the first timing mark comprises a plurality of timing extensions to the first timing mark, and wherein the second timing mark comprises a timing extension to a timing mark within the radial trajectory of the first timing mark.

7. The method of claim 1, wherein the second radius is different than the first radius.

8. The method of claim 1, further comprising the step of:
    repeating the detecting step and the writing step to write at least one additional timing mark thereby writing a plurality of timing marks constituting at least one of a set of timing indicators and a set of servo data, for writing a servopattern on the rotatable storage medium.

9. The method of claim 1, further comprising the steps of:
    repeating the detecting step and the writing step to write at least one additional timing mark constituting a plurality of timing marks for writing a plurality of servo data at predetermined delays after each of the plurality of timing marks, respectively, thereby constituting a servopattern on the rotatable storage medium.

10. The method of claim 1, further comprising the step of:
    calculating a predetermined delay time from a measured time interval corresponding to the time difference between performing a detecting step and a writing step; and
    wherein the writing step includes a step of writing at least one additional timing mark at a location along the radial trajectory on the rotatable storage medium that is calculated based at least in part on the predetermined delay time.

11. The method of claim 1, wherein the location of the second timing mark is determined by a delay after the passage of the first timing mark.

12. The method of claim 11, wherein the second timing mark at the second radius comprises a timing extension of the first timing mark at the first radius.

13. The method of claim 11, wherein the radial trajectory of the first timing mark comprises a plurality of timing extensions to the first timing mark, and wherein the second timing mark comprises a timing extension to a timing mark within the radial trajectory of the first timing mark.

14. The method of claim 11, wherein the second radius is different than the first radius.

15. The method according to claim 11, further comprising the step of:

repeating the detecting step and the writing step to write at least one additional timing mark thereby writing a plurality of timing marks for writing a servopattern on the rotatable storage medium.

16. The method of claim 11, further comprising the step of:

repeating the detecting step and the writing step to write at least one additional timing mark constituting servo data and thereby writing a plurality of servo data to write a servopattern on the rotatable storage medium.

17. The method of claim 1, further comprising the step of:

detecting the passage of a third timing mark at a third radius of the rotatable storage medium; and wherein the location of writing the second timing mark is determined at least in part by a predetermined delay after detecting the passage of the third timing mark.

18. The method according to claim 17, wherein the second timing mark at the second radius comprises a timing extension of the first timing mark at the first radius.

19. The method of claim 17, wherein the radial trajectory of the first timing mark comprises a plurality of timing extensions to the first timing mark, and wherein the second timing mark comprises a timing extension to a timing mark within the radial trajectory of the first timing mark.

20. The method according to claim 17, wherein the second radius is different than the first radius.

21. The method according to claim 17, further comprising the step of:

repeating the detecting step and the writing step to write at least one additional timing mark thereby writing a plurality of timing marks constituting a servopattern on the rotatable storage medium.

22. The method according to claim 17, further comprising the steps of:

repeating the detecting step and the writing step to write at least one additional timing mark constituting a plurality of timing marks; and writing servo data based at least in part on the plurality of timing marks thereby writing a servopattern on the rotatable storage medium.

23. A computer readable medium including computer instructions for writing a plurality of timing marks on a rotatable storage medium, the computer instructions comprising instructions for:

during a rotation of the rotatable storage medium, detecting the passage of at least a portion of a first timing mark located at a radial trajectory at a first radius of the rotatable storage medium;

during the same rotation of the rotatable storage medium, writing a second timing mark at a second radius of the rotatable storage medium, the second timing mark being located at least one of
a) where at least a portion of the second timing mark overlaps at least a portion of the radial trajectory of the first timing mark, and
b) where the second timing mark is in close proximity to the radial trajectory of the first timing mark.

24. The computer readable medium of claim 23, further including computer instructions for:

repeating the detecting and the writing instructions to write at least one additional timing mark thereby writing a plurality of timing marks constituting at least one of a set of timing indicators and a set of servo data, for writing a servopattern on the rotatable storage medium.

25. The computer readable medium of claim 23, further including computer instructions for:

detecting the passage of a third timing mark at a third radius of the rotatable storage medium; and wherein the location of writing the second timing mark is determined at least in part by a predetermined delay after detecting the passage of the third timing mark.

26. The computer readable medium of claim 23, wherein the location of the second timing mark is determined by a delay after the passage of the first timing mark.

27. A method for writing a plurality of timing marks on a rotatable storage medium, the method comprising the steps of:

during a revolution of a rotatable storage medium, detecting a first timing mark in a radial trajectory on the rotatable storage medium, the radial trajectory comprising a set of timing mark extensions;

during the same rotation of the rotatable storage medium, writing a second timing mark on the rotatable storage medium at a location at least in part aligned with the radial trajectory, and wherein the second timing mark comprises a timing mark extension to a timing mark in the radial trajectory.

* * * * *